US012580255B2

(12) United States Patent
Park et al.

(10) Patent No.: US 12,580,255 B2
(45) Date of Patent: Mar. 17, 2026

(54) BUTTON SECONDARY BATTERY AND METHOD FOR MANUFACTURING THE SAME

(71) Applicant: LG ENERGY SOLUTION, LTD., Seoul (KR)

(72) Inventors: Geun Young Park, Daejeon (KR); Yong Gon Lee, Daejeon (KR); Min Su Cho, Daejeon (KR); Byung Sup Kim, Daejeon (KR); Joo Hwan Sung, Daejeon (KR); Min Gyu Kim, Daejeon (KR); Min Seon Kim, Daejeon (KR); Yeong Hun Jung, Daejeon (KR); Sang Hak Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 680 days.

(21) Appl. No.: 17/918,856

(22) PCT Filed: Jul. 29, 2021

(86) PCT No.: PCT/KR2021/009933
§ 371 (c)(1),
(2) Date: Oct. 13, 2022

(87) PCT Pub. No.: WO2022/025687
PCT Pub. Date: Feb. 3, 2022

(65) Prior Publication Data
US 2023/0238624 A1      Jul. 27, 2023

(30) Foreign Application Priority Data

Jul. 29, 2020   (KR) ........................ 10-2020-0094816
Jul. 23, 2021   (KR) ........................ 10-2021-0097283

(51) Int. Cl.
H01M 50/184     (2021.01)
H01M 50/109     (2021.01)
(Continued)

(52) U.S. Cl.
CPC ....... H01M 50/184 (2021.01); H01M 50/109 (2021.01); H01M 50/186 (2021.01); H01M 50/545 (2021.01)

(58) Field of Classification Search
CPC ............. H01M 50/109; H01M 50/184; H01M 50/186; H01M 50/545
(Continued)

(56) References Cited

U.S. PATENT DOCUMENTS 5,576,117 A    11/1996   Morita et al.
5,725,967 A    3/1998    Tuttle
(Continued)

FOREIGN PATENT DOCUMENTS

CN      101405896 A      4/2009
CN      107425145 A      12/2017
(Continued)

OTHER PUBLICATIONS

International Search Report (with partial translation) and Written Opinion dated Nov. 22, 2021, for corresponding International Patent Application No. PCT/KR2021/009933.
(Continued)

*Primary Examiner* — Kevin P Kerns
(74) *Attorney, Agent, or Firm* — Morgan, Lewis & Bockius LLP

(57) ABSTRACT

A button secondary battery includes: a lower can serving as a first electrode terminal; an upper can coupled to surround the lower can and serving as a second electrode terminal; and a gasket provided between the lower can and the upper can, wherein a recessed lower insertion groove and a
(Continued)

recessed upper insertion groove are formed in a surface of the lower can and a surface of the upper can, which are in direct contact with the gasket, respectively, the lower insertion groove and the upper insertion groove are spaced apart from each other so as not to face each other, and a sealing protrusion having a closed curve shape and being in direct contact with the lower can and the upper can to increase in sealing force is formed on the gasket.

8 Claims, 9 Drawing Sheets

(51) Int. Cl.
    *H01M 50/186*     (2021.01)
    *H01M 50/545*     (2021.01)

(58) Field of Classification Search
    USPC ................................................. 429/164, 174
    See application file for complete search history.

(56)           References Cited

U.S. PATENT DOCUMENTS

| | | |
|---|---|---|
| 2007/0015046 A1 | 1/2007 | Kim et al. |
| 2007/0224500 A1 | 9/2007 | White et al. |
| 2011/0223471 A1 | 9/2011 | Sato et al. |
| 2013/0309540 A1 | 11/2013 | Nakaishi et al. |
| 2015/0243938 A1 | 8/2015 | Kim et al. |
| 2018/0097215 A1 | 4/2018 | Cho et al. |
| 2019/0252648 A1 | 8/2019 | Koyama et al. |
| 2021/0050562 A1 | 2/2021 | Xue et al. |
| 2021/0111454 A1 | 4/2021 | Zhu et al. |
| 2021/0203034 A1 | 7/2021 | Yoon et al. |
| 2021/0328290 A1 | 10/2021 | Lee et al. |

FOREIGN PATENT DOCUMENTS

| | | |
|---|---|---|
| CN | 109449320 A | 3/2019 |
| CN | 210379131 U | 4/2020 |
| EP | 4057430 A1 | 9/2022 |
| JP | S52-84619 U | 6/1977 |
| JP | H01-081862 U | 5/1989 |
| JP | H01-181862 U | 5/1989 |
| JP | H09-045297 A | 2/1997 |
| JP | 2009-530786 A | 8/2009 |
| JP | 2012-133902 A | 7/2012 |
| JP | 2015-527723 A | 9/2015 |
| JP | 2015-198036 A | 11/2015 |
| JP | 5839802 B2 | 1/2016 |
| JP | 5909519 B2 | 4/2016 |
| JP | 6286195 B2 | 2/2018 |
| JP | WO2018/124152 A1 | 7/2018 |
| JP | 2002-56828 A | 2/2022 |
| KR | 10-0194914 B1 | 6/1999 |
| KR | 10-2007-0007537 A | 1/2007 |
| KR | 10-2009-0081411 A | 7/2009 |
| KR | 10-2017-0087325 A | 7/2017 |
| KR | 10-2018-0036086 A | 4/2018 |
| KR | 10-2020-0005346 A | 1/2020 |
| KR | 10-2020-0020619 A | 2/2020 |
| WO | 2020/093468 A1 | 5/2020 |
| WO | 2022/005232 A1 | 1/2022 |

OTHER PUBLICATIONS

Extended European Search Report dated Jul. 3, 2024 issued in European Patent Application No. 21850951.1. Note: EP 4 057 430 A1 and U.S. Pat. No. 5,725,967 A cited therein are already of record.
Office Action issued Sep. 23, 2023 for corresponding Chinese Patent Application No. 202180027251.7 Note: US 2018/0097215 A1, CN 107425145 A, JP 2015-198036 A & U.S. Pat. No. 5576117 A were cited in a prior IDS.
Office Action issued Oct. 3, 2023 for corresponding Japanese Patent Application No. 2022-554372 Note: JP 2009-530786 A was cited in a prior IDS.

BUTTON SECONDARY BATTERY AND METHOD FOR MANUFACTURING THE SAME

CROSS-REFERENCE TO RELATED APPLICATION

The present application claims the benefit of the priority of Korean Patent Application Nos. 10-2020-0094816, filed on Jul. 29, 2020, and 10-2021-0097283, filed on Jul. 23, 2021, which are hereby incorporated by reference in their entirety.

TECHNICAL FIELD

The present invention relates to a button-type secondary battery and a method for manufacturing the same, and more particularly, to a button-type secondary battery in which bonding and sealing between a lower can and an upper can increase through improvement of a gasket, and a method for manufacturing the same.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like.

The secondary battery comprises a button-type secondary battery having high energy density, high output, and long lifespan. The button-type secondary battery comprises an electrode assembly, a lower can accommodating the electrode assembly, an upper can bonded to the lower can, and a gasket insulating and sealing the lower can and the upper can.

However, in the button-type secondary battery, if fitting force is high when the lower can and the upper can are bonded to each other, the gasket is damaged, and if bonding force and adhesion between the lower can and the upper can decrease, and the fitting force is weak, the gasket is prevented from being damaged, but there is a problem in that the bonding force and adhesion between the lower can and the upper can decreases.

DISCLOSURE OF THE INVENTION

Technical Problem

The present invention is invented to solve the above problems, and an object of the present invention is to provide a button-type secondary battery capable of improving a gasket to prevent the gasket from being damaged and to improve bonding and sealing between a lower can and an upper can, and a method for manufacturing the same.

Technical Solution

A button-type secondary battery according to the present invention for achieving the above object comprises: a lower can serving as a first electrode terminal; an upper can coupled to surround the lower can and serving as a second electrode terminal; and a gasket provided between the lower can and the upper can, wherein a recessed lower insertion groove and a recessed upper insertion groove are formed in a surface of the lower can and a surface of the upper can, which are in close contact with the gasket, respectively, the lower insertion groove and the upper insertion groove are spaced apart from each other so as not to face each other, and a sealing protrusion having a closed curve shape and being in close contact with the lower can and the upper can to increase in sealing force is formed on the gasket.

The lower insertion groove and the upper insertion groove may be formed at a side of the surface of the lower can and a side of the surface of the upper can, respectively, and the sealing protrusion may be formed on a surface of the gasket that is in close contact with the other side of the surface of the lower can and the other side of the surface of the upper can.

The sealing protrusion may comprise: an inner sealing protrusion formed on an inner circumferential surface of the gasket and having a closed curve shape that is pressed to the surface of the lower can; and an outer sealing protrusion formed on an outer circumferential surface of the gasket and having a closed curve shape that is pressed to the surface of the upper can.

The inner sealing protrusion and the outer sealing protrusion may be disposed to be spaced apart from each other so as not to be symmetrical to each other with respect to the gasket.

Portions of the gasket may be introduced into the lower insertion groove and the upper insertion groove by clamping of the lower can and the upper can to form a lower insertion protrusion and an upper insertion protrusion on a surface of the gasket, respectively, a contact area between the lower can and the gasket may increase by the lower insertion protrusion, and a contact area between the upper can and the gasket may increase by the upper insertion protrusion.

The lower insertion groove or the upper insertion groove may have a triangular shape that gradually decreases in width toward the bottom.

The lower insertion groove or the upper insertion groove may be provided in two or more, and the two or more lower insertion grooves or the two or more upper insertion grooves may be provided so that ends of the lower insertion grooves or the upper insertion grooves are connected to each other in a direction in which the lower can and the upper can are clamped to each other.

The two or more lower insertion grooves or the two or more upper insertion grooves may be provided to gradually increase in size in a direction in which the lower can and the upper can are clamped to each other.

A method for manufacturing a button-type secondary battery according to the present invention comprises: a preparation process of preparing a lower can having a recessed lower insertion groove, an upper can having a recessed upper insertion groove, and a gasket, on which a sealing protrusion having a closed curve shape is formed; an accommodation process of accommodating an electrode assembly, in which a first electrode, a separator, and a second electrode are alternately disposed, in the lower can; a disposition process of disposing the gasket on an upper portion of the lower can; and a clamping process of disposing the upper can on an upper portion of the lower can to clamp the lower can to the upper can, thereby manufacturing the button-type secondary battery, wherein, in the preparation process, the lower insertion groove formed in the lower can and the upper insertion groove formed in the upper can are disposed to be spaced apart from each other so as not to face each other when the lower can and the upper can are bonded to each other, and in the clamping process, the sealing protrusion of the gasket is in close contact with the lower can and the upper can to increase in sealing force.

In the clamping process, when the lower can and the upper can are clamped, portions of the gasket may be introduced into the lower insertion groove and the upper insertion groove form a lower insertion protrusion and an upper insertion protrusion on a surface of the gasket, respectively, a contact area between the lower can and the gasket may increase by the lower insertion protrusion, and a contact area between the upper can and the gasket may increase by the upper insertion protrusion.

In the clamping process, the sealing protrusion may comprise: an inner sealing protrusion formed on an inner circumferential surface of the gasket and having a closed curve shape that is pressed to the surface of the lower can; and an outer sealing protrusion formed on an outer circumferential surface of the gasket and having a closed curve shape that is pressed to the surface of the upper can.

Advantageous Effects

The button-type secondary battery according to the present invention may comprise the lower can, the upper can, and the gasket. The recessed lower insertion groove and the recessed upper insertion groove may be formed in the lower can and the upper can, which are in close contact with the gasket, respectively. Here, the lower insertion groove and the upper insertion groove may be disposed to be spaced apart from each other so as not to face each other, and the sealing protrusion having the closed curve shape may be formed on the surface of the gasket. Due to these characteristics, the press-fitting force, the bonding force, and the sealing force between the lower can and the upper can may increase.

Particularly, in the button-type secondary battery according to the present invention, when the lower can and the upper can are clamped, the portion of the gasket may be introduced into the lower insertion groove and the upper insertion groove to form the lower insertion protrusion and the upper insertion protrusion on the surface of the gasket, respectively. Thus, even though the press-fitting force of the lower can and the upper can increases, the gasket may be prevented from being damaged, and also, the contact area between the lower can and the gasket or between the upper can and the gasket may increase to improve the adhesion and bonding between the lower can and the upper can.

In addition, in the button-type secondary battery according to the present invention, the sealing protrusion may comprise the inner sealing protrusion formed on the inner circumferential surface of the gasket so as to be pressed to the outer circumferential surface of the lower can and the outer sealing protrusion formed on the outer circumferential surface of the gasket so as to be pressed to the inner circumferential surface of the upper can. Due to these characteristics, the sealing force between the lower can and the gasket and between the upper can and the gasket may greatly increase. Particularly, since each of the inner sealing protrusion and the outer sealing protrusion is provided in plurality, the sealing force between the lower can and the gasket and between the upper can and the gasket may greatly increase.

In addition, in the button-type secondary battery according to the present invention, the inner sealing protrusion and the outer sealing protrusion may be spaced apart from each other so as not to be symmetrical to each other with respect to the gasket. Due to these characteristics, the sealing force between the lower can and the gasket and between the upper can and the gasket may greatly increase.

In addition, in the button-type secondary battery of the present invention, the lower insertion groove or the upper insertion groove may have the triangular shape that gradually decreases in width toward the bottom. Therefore, the gasket may be stably introduced into the entire lower insertion groove and the entire upper insertion groove, and thus, the insertion protrusion having the same shape as each of the lower insertion groove and the upper insertion groove may be formed, and as a result, the adhesion and the bonding force between the lower can and the upper can may increase.

MODE FOR CARRYING OUT THE INVENTION

Figure 1:
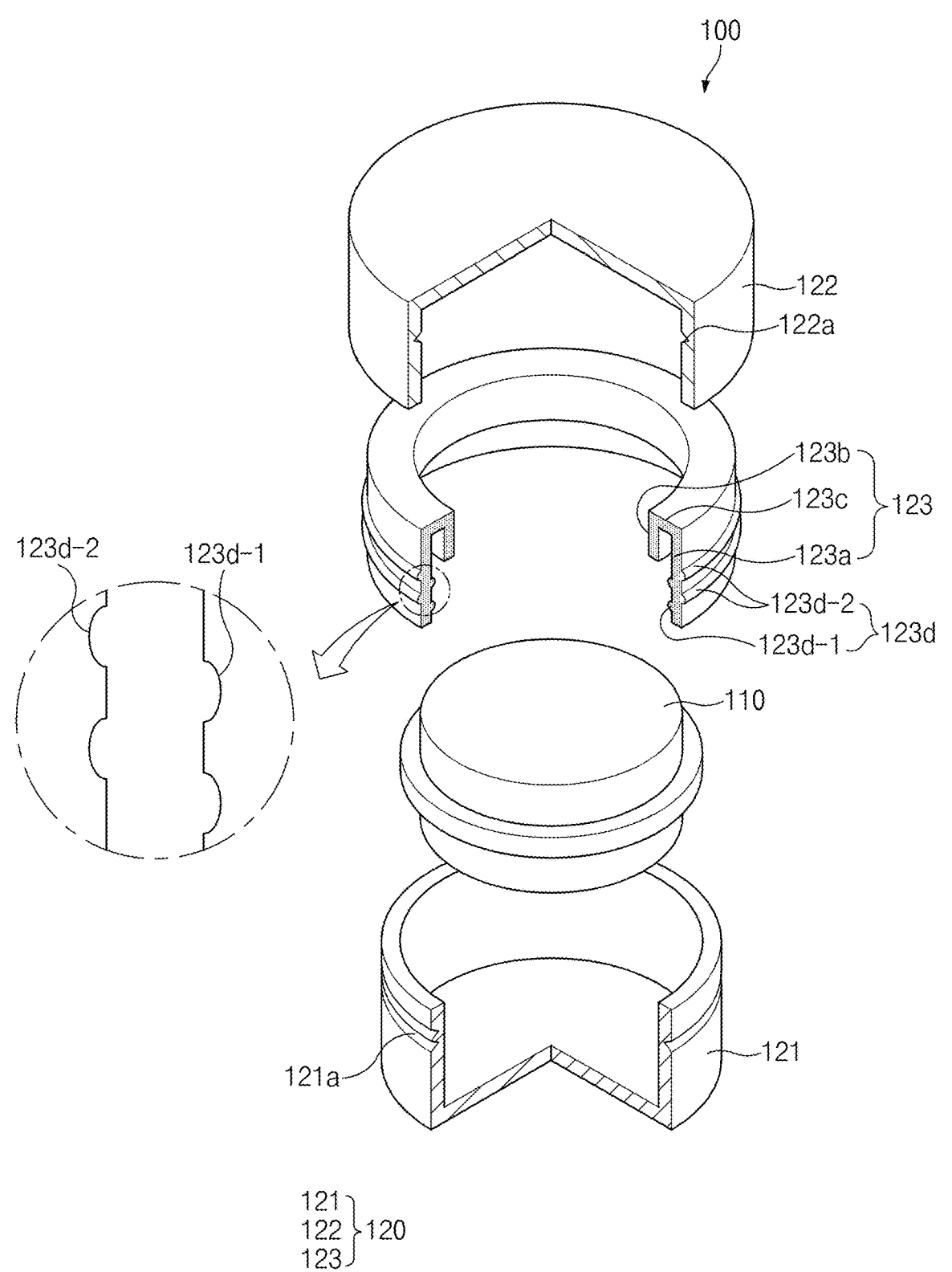
FIG. 1 is an exploded perspective view of a button-type secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Button-Type Secondary Battery According to First Embodiment of the Present Invention]

Figure 2:
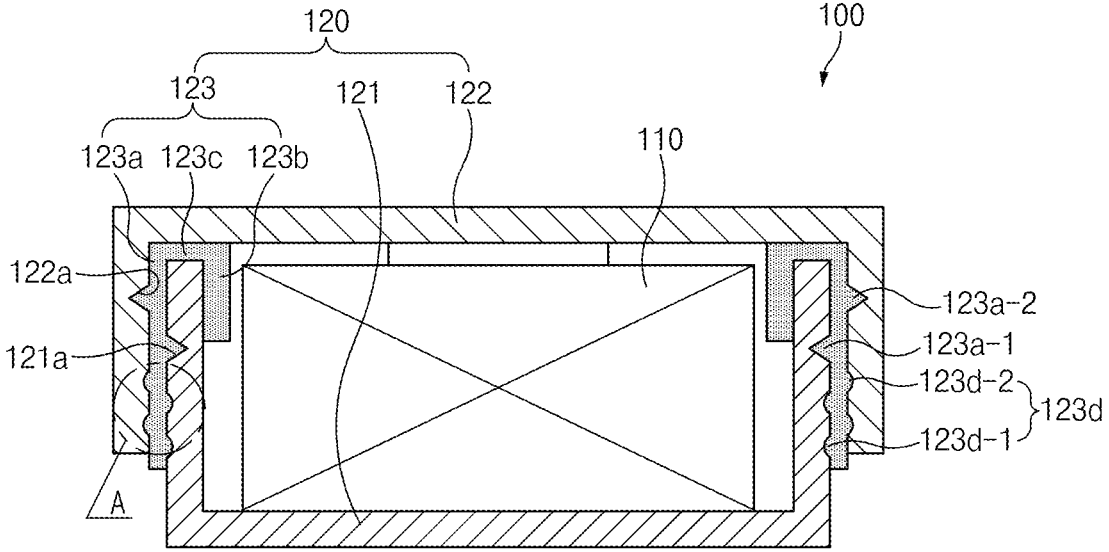
FIG. 2 is an assembly cross-sectional view of the button-type secondary battery according to the first embodiment of the present invention.
Figure 3:
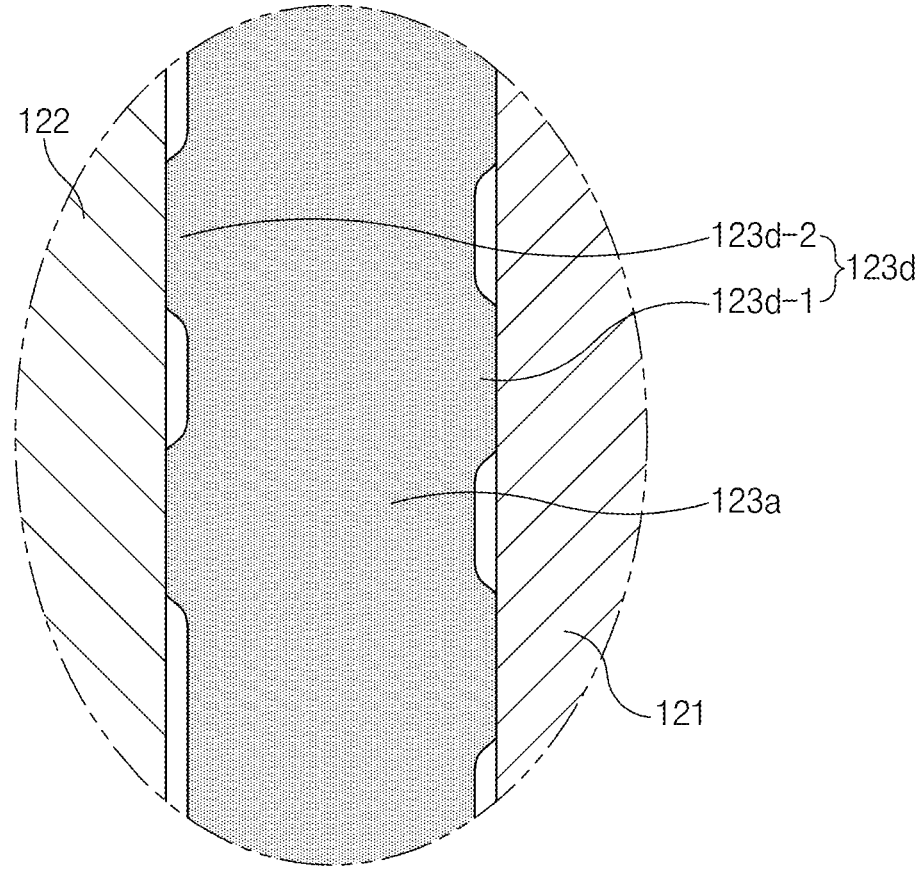
FIG. 3 is an enlarged view of a portion A illustrated in FIG. 2.
Figure 4:
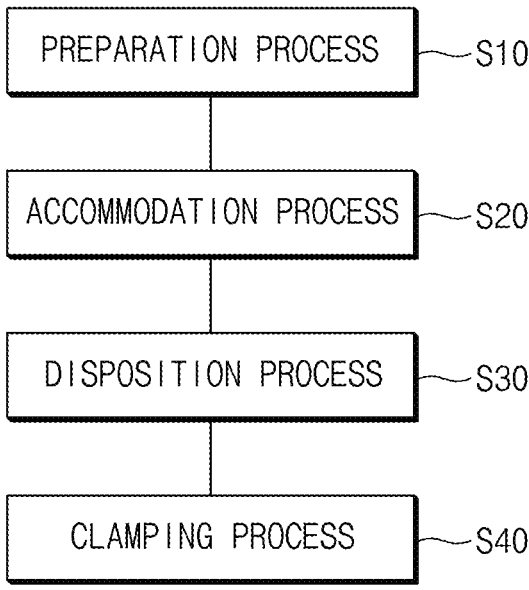
FIG. 4 is a flowchart illustrating a method for manufacturing a button-type secondary battery according to the first embodiment of the present invention.

As illustrated in FIGS. 1 to 3, a button-type secondary battery 100 according to a first embodiment of the present invention is a secondary battery, of which a length of a diameter is greater than a height, and comprises an electrode assembly 110 and a can assembly 120 accommodating the electrode assembly 110.

The button-type secondary battery is referred as a coin cell, also referred to as a Ruben battery, an RM battery, and a mercury battery. Since such a button-type secondary battery is made small, the button-type secondary battery is widely used in hearing aids, portable lidos, wireless microphones, cameras, watches, and the like. Also, zinc is used for a negative electrode, mercury oxide is used for a positive electrode, and zinc oxide and potassium hydroxide are used for the electrolyte.

Electrode Assembly

The electrode assembly 110 has a three-layered structure in which a first electrode, a separator, and a second electrode are sequentially disposed. The electrode assembly is not limited to the three-layered structure and may have a three or more-layered structure in which a first electrode and a second electrode are alternately disposed with a separator interposed therebetween.

Here, the separator is formed to be larger than each of the first electrode and the second electrode, and thus, the separator prevents the first electrode and the second electrode from being grounded, thereby preventing an accident due to short circuit from occurring. The first electrode is a negative electrode, and the second electrode is a positive electrode.

Can Assembly

The can assembly 120 comprises a lower can 121 connected to a first electrode of the electrode assembly 110 and serving as a first electrode terminal, an upper can 122 connected to a second electrode of the electrode assembly 110, bonded to surround the lower can 121, and serving as a second electrode terminal, and a gasket 123 provided between the lower can 121 and the upper can 122 to insulate the lower can from the upper can and seal a gap between the lower can and the upper can.

Here, the gasket 123 comprises an outer portion 123a disposed between the lower can 121 and the upper can 122, an inner portion 123b supported on the inner wall of the lower can 121, and a connection part 123c connecting an upper end of the outer portion 123a to an upper end of the inner portion 123b. The gasket 123 having such a structure insulates the lower can 121 from the upper can 122 and seals the gap between the lower can 121 and the upper can 122.

The button-type secondary battery 100 according to the first embodiment of the present invention has a structure, in which sealing and bonding force between the lower can 121 and the upper can 122 increase.

That is, a sealing protrusion 123d extending along a circumferential surface (a circumferential surface of the gasket when viewed in FIG. 1) of the gasket and having a closed curve shape may be formed on a surface of the gasket 123, and the sealing protrusion 123d may allow pressing force between the lower can 121 and the upper can 122 to increase so that the bonding force and sealing force between the lower can 121 and the upper can 122 increase.

For example, the sealing protrusion 123d comprises an inner sealing protrusion 123d-1 having a closed curved shape and extending along an inner circumferential surface of an outer portion 123a of the gasket 123 so as to be pressed to the outer circumferential surface of the upper can 121 and an outer sealing protrusion 123d-2 having a closed curve shape and extending along an outer circumferential surface of an outer portion 123a of the gasket 123 so as to be pressed to the outer circumferential surface of the upper can 122.

That is, the inner sealing protrusion 123d-1 may be provided to protrude from the inner circumferential surface of the outer portion 123a of the gasket 123 and thus be pressed to the outer circumferential surface of the lower can 121, and as a result, press-fitting force (bonding force) and sealing force between the lower can 121 and the gasket 123 may increase. Also, the outer sealing protrusion 123d-2 may be provided to protrude from the outer circumferential surface of the outer portion 123a of the gasket 123 and thus be pressed to the inner circumferential surface of the upper can 122, and as a result, press-fitting force (bonding force) and sealing force between the upper can 122 and the gasket 123 may increase.

In other words, in the present invention, although the press-fitting force between the lower can and the upper can decreases to prevent the gasket from being damaged, the press-fitting force between the lower can and the upper can may be reinforced by the sealing protrusion 123d to prevent the press-fitting force (bonding force) and sealing force of the can 122 from being weakened.

A cross-section of each of the inner sealing protrusion 123d-1 and the outer sealing protrusion 123d-2 may have any one of a semi-circular shape, a semi-elliptical shape, a curved shape, a square shape, and a triangular shape. Also, the inner sealing protrusion 123d-1 and the outer sealing protrusion 123d-2 may have the same cross-sectional shape, but may have different cross-sectional shapes. Also, the inner sealing protrusion 123d-1 and the outer sealing protrusion 123d-2 may have different cross-sectional sizes. Particularly, the inner sealing protrusion 123d-1 and the outer sealing protrusion 123d-2 may be integrally formed with the gasket.

A maximum height of each of the inner sealing protrusion 123d-1 and the outer sealing protrusion 123d-2 protruding from the surface of the gasket may be 1 mm to 3 mm.

Here, referring to FIGS. 2, 3, 8, and 9, in the secondary battery according to the first embodiment of the present application, although a groove is formed in each of the outer circumferential surface of the lower can 121 and the inner circumferential surface of the upper can 122, this is to clearly show the inner sealing protrusion 123d-1 and the outer sealing protrusion 123d-2, and thus, the groove, into which each of the inner sealing protrusion 123d-1 and the outer sealing protrusion 123d-2 is inserted, may not be formed in each of the outer circumferential surface of the lower can 121 and the inner circumferential surface of the upper can 122. Therefore, the sealing protrusions may be tightly fitted between the cans to significantly increase in sealing force.

In another embodiment of the present invention, a groove into which the inner sealing protrusion 123d-1 is inserted may be formed in the outer circumferential surface of the lower can 121, and a groove into which the outer sealing protrusion 123d-2 is inserted may be formed in the inner circumferential surface of the upper can 122. Thus, a contact area between the lower can 121 and the gasket 123 or the upper can 122 and the gasket 123 may increase, and thus the bonding force and sealing force may increase. Particularly, if the groove for inserting the inner sealing protrusion 123d-1 and the outer sealing protrusion 123d-2 is formed in the cans, respectively, the bonding process may be easier, and an outer appearance may be improved.

Therefore, the button-type secondary battery 100 according to the first embodiment of the present invention may comprise the sealing protrusions 123d on the surface of the gasket 123 to increase in pressing force and sealing force between the lower can 121 and the gasket 123 and between the upper can 122 and the gasket 123, thereby preventing an electrolyte from leaking.

The inner sealing protrusion 123d-1 and the outer sealing protrusion 123d-2 may be disposed to be spaced apart from each other in a vertical direction so as not to be symmetrical to each other with respect to the gasket as illustrated in FIG. 1. Particularly, when two or more of the inner sealing protrusion 123*d*-1 and the outer sealing protrusion 123*d*-2 are provided, the two or more inner sealing protrusions 123*d*-1 and the two or more outer sealing protrusions 123*d*-2 may be disposed on both sides of the gasket in a zigzag manner.

Thus, referring to FIG. 3, the inner sealing protrusion 123*d*-1 may be transformed into a space between the outer sealing protrusion 123*d*-2 and the outer sealing protrusion 123*d*-2, and the outer protrusion 123*d*-2 may be transformed into a space between the inner sealing protrusion 123*d*-1 and the inner sealing protrusion 123*d*-1. As a result, the inner and outer sealing protrusions may be prevented from being damaged.

The button-type secondary battery 100 according to the first embodiment of the present invention has a structure, in which adhesion and bonding force between the lower can 121 and the upper can 122 increase.

That is, a recessed lower insertion groove 121*a* is formed in the surface (an upper side of the outer surface of the lower can when viewed in FIG. 2) of the lower can 121 that is in close contact with the gasket 123, and a recessed upper groove 122*a* is formed in the surface (an upper side of the inner surface of the upper can when viewed in FIG. 2) of the upper can 122 that is in close contact with the gasket 123.

Here, the lower insertion groove 121*a* and the upper insertion groove 122*a* are disposed to be spaced apart from each other so as not to face each other when viewed in a state in which the lower can 121 and the upper can 122 are bonded to each other.

Thus, when the lower can 121 and the upper can 122 are clamped, portions of the gasket 123 are introduced (i.e., inserted) into the lower insertion groove 121*a* and the upper insertion groove 122*a* to form the lower insertion protrusion 123*a*-1 and the upper insertion protrusion 123*a*-2 on the surface of the gasket 123, respectively. As a result, a contact area between the lower can 121 and the gasket 123 may increase by the lower insertion protrusion 123*a*-1 to increase in adhesion and bonding force. In addition, a contact area between the upper can 122 and the gasket 123 may increase by the upper insertion protrusion 123*a*-2 to increase in adhesion and bonding force.

The clamping refers to press-fitting or clamping two objects.

In more detail, the gasket 123 is disposed on an upper portion of the lower can 121, and then the upper can 122 is disposed on an upper portion of the gasket 123. Next, the upper can 122 is pressed in a direction of the lower can 121 to bond the upper can 122 and the lower can 121 to each other. Here, the gasket 123 disposed between the upper can 122 and the lower can 121 may be pressed so that the portions of the gasket 123 are introduced into the lower insertion groove 121*a* and the upper insertion groove 122*a* to form the lower insertion protrusion 123*a*-1 and the upper insertion protrusion 123*a*-2 on the surface of the gasket 123, respectively.

Particularly, the lower insertion groove 121*a* and the upper insertion groove 122*a* are disposed in the lower can 121 and the upper can 122 and spaced apart from each other so as not to face each other. Thus, the lower insertion protrusion 123*a*-1 and the upper insertion protrusion 123*a*-2 formed on the surface of the gasket 123 are spaced apart from each other so as not to face each other. That is, the lower insertion protrusion 123*a*-1 and the upper insertion protrusion 123*a*-2 are disposed to be spaced apart from each other in the vertical direction so as not to be symmetrical to each other with respect to the outer portion 123*a* as illustrated in FIG. 2. As a result, an amount of insertion of the gasket 123, which is inserted into each of the lower insertion groove 121*a* and the upper insertion groove 122*a*, may be sufficiently secured. Thus, since the amount of insertion of the gasket, which is inserted into the lower insertion groove 121*a* and the upper insertion groove 122*a*, is sufficiently secured, the lower insertion protrusion 123*a*-1 and the upper insertion protrusion 123*a*-2 may be stably formed, and as a result, the adhesion force and the bonding force between the lower can 121 and the upper can 122 may increase.

In the button-type secondary battery 100 according to the first embodiment of the present invention, the upper insertion groove 122*a* is formed to be larger than the lower insertion groove 121*a*. That is, referring to FIG. 2, a contact area between the upper can 122 and the gasket 123 is less than that between the lower can 121 and the gasket 123. Thus, the upper insertion groove 122*a* is formed to be larger than the lower insertion groove 121*a* to increase in contact area between the upper can 122 and the gasket 123, thereby preventing an electrode from leaking.

Here, the lower insertion protrusion 123*a*-1 may be provided to adhere to the lower insertion groove 121*a*, and the upper insertion protrusion 123*a*-2 may be provided to adhere to the upper insertion groove 122*a*. For example, the lower insertion protrusion 123*a*-1 may adhere to the lower insertion groove 121*a* through an adhesive, and the upper insertion protrusion 123*a*-2 may adhere to the upper insertion groove 122*a* through an adhesive.

In the button-type secondary battery 100 according to the first embodiment of the present invention, the lower insertion groove 121*a* or the upper insertion groove 122*a* may have a triangular shape of which a width gradually decreases toward the bottom. That is, the amount of insertion of the gasket 123 gradually decreases toward the bottom of the lower insertion groove 121*a* or the upper insertion groove 122*a*. Thus, the lower insertion groove 121*a* or the upper insertion groove 122*a* may be formed in the triangular shape, and thus, the amount of insertion of the gasket 123 may be stably secured up to the bottom of the lower insertion groove 121*a* or the upper insertion groove 122*a*. As a result, the insertion protrusions 123*a*-1 and 123*a*-2 may be stably formed on the surface of the gasket.

The lower insertion groove 121*a* or the upper insertion groove 122*a* may be formed in a semicircular shape that gradually decreases in width toward the bottom.

Here, the lower insertion groove 121*a* or the upper insertion groove 122*a* may be formed in the form of a right-angled triangle in which an inner wall facing the lower can 121 is horizontal. Thus, each of the insertion protrusions 123*a*-1 and 123*a*-2 formed on the gasket 123 may also be formed in the form of a right-angled triangle. That is, when clamping the lower can 121 and the upper can 122, a portion of the gasket may be hooked in the lower insertion groove 121*a* or the horizontal inner wall of the upper insertion groove 122*a*, and thus, the amount of insertion of the gasket, which is inserted into the lower insertion groove 121*a* or the upper insertion groove 122*a*, may be sufficiently secured, and as a result, the insertion protrusion may be smoothly formed on the surface of the gasket.

In the button-type secondary battery 100 according to the first embodiment of the present invention, the sealing protrusion 123*d* is formed on the surface of the gasket 123 in which the lower insertion groove and the upper insertion groove are not provided.

That is, the lower insertion groove and the upper insertion groove are formed at a side of the surface of the lower can and a side of the surface of the upper can, respectively, and the sealing protrusion is formed on the surface of the gasket that is in close contact with the other side of the surface of the lower can and the other side of the surface of the upper can. Thus, the sealing protrusion 123d may be prevented from being inserted into the lower insertion groove and the upper insertion groove.

Therefore, in the button-type secondary battery 100 according to the first embodiment of the present invention, the recessed lower insertion groove 121a and the recessed upper insertion groove 122a may be formed in the lower can 121 and the upper can 122, respectively. Here, the lower insertion groove 121a and the upper insertion groove 122a may be disposed to be spaced apart from each other so as not to face each other. Particularly, the sealing protrusion may be formed on the surface of the gasket to prevent the gasket from being damaged, and the bonding force and the sealing force between the lower can 121 and the upper can 122 may increase.

Hereinafter, a method for manufacturing a button-type secondary battery according to a first embodiment of the present invention will be described.

[Method for Manufacturing Button-Type Secondary Battery According to First Embodiment of the Present Invention]

As illustrated in FIGS. 4 to 8, a method for manufacturing a button-type secondary battery according to the first embodiment of the present invention comprises a preparation process (S10), an accommodation process (S20), a disposition process (S30), and a clamping process (S40).

Preparation Process

Figure 5:
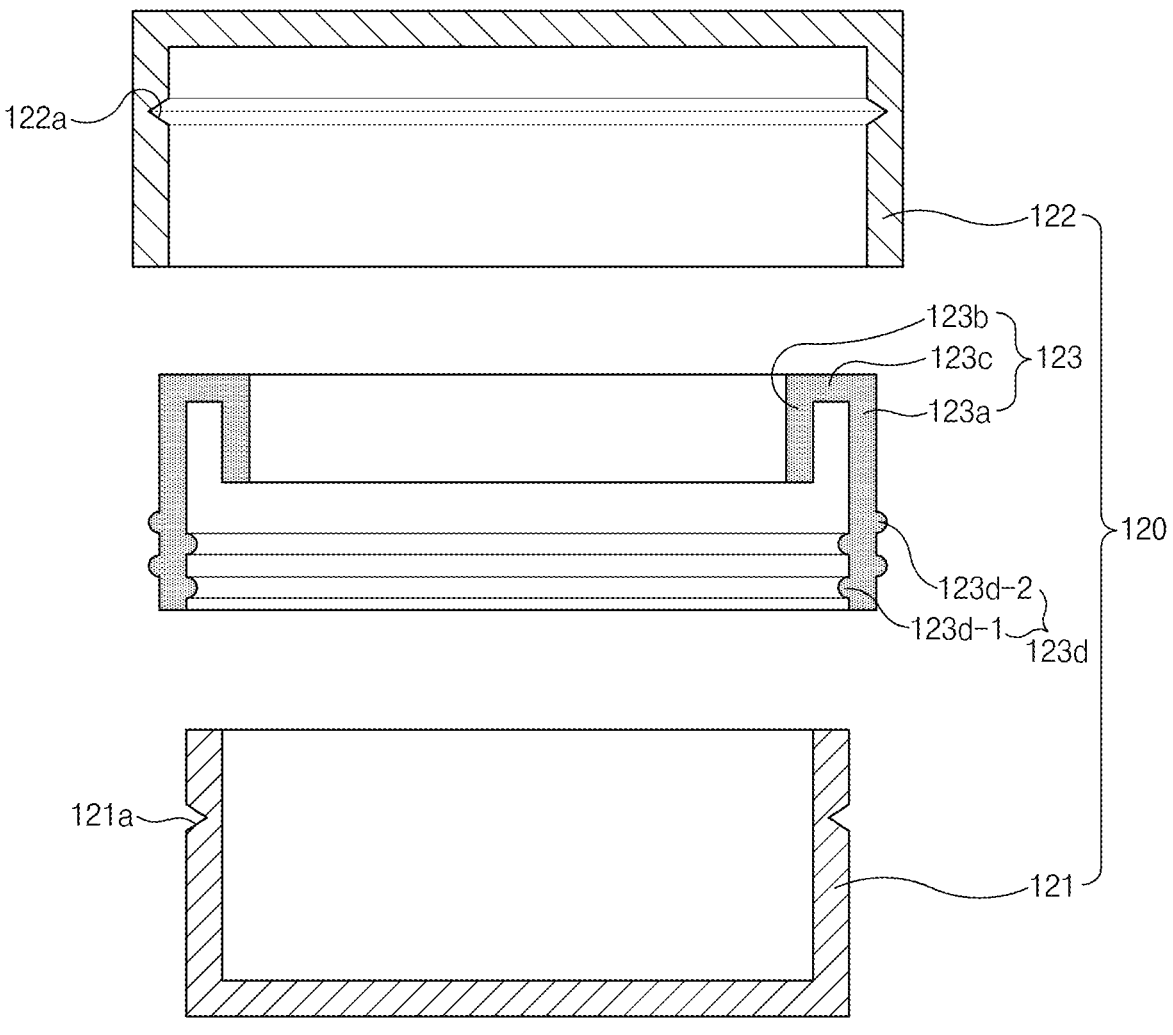
FIG. 5 is a cross-sectional view illustrating a preparation process in the method for manufacturing the button-type secondary battery according to the first embodiment of the present invention.

In the preparation process (S10), referring to FIG. 5, a lower can 121, an upper can 122, and a gasket 123 having insulation and disposed between the lower can 121 and the upper can 122 are prepared.

The lower can 121 is provided with an accommodating groove for accommodating an electrode assembly in an upper surface thereof and a recessed lower insertion groove 121a formed in an outer circumferential surface of the accommodating groove. Particularly, a lower insertion groove 121a is formed along a circumferential surface of the lower can 121, and then both ends of the lower insertion groove 121a are connected to each other.

The upper can 122 is provided with a bonding groove, to which the lower can 121 is bonded to a bottom surface thereof, and a recessed upper insertion groove 122a formed in a wall surface of the bonding groove. Particularly, an upper insertion groove 122a is formed along a circumferential surface of the upper can 122, and then both ends of the lower insertion groove 121a are connected to each other.

The gasket 123 comprises an outer portion 123a provided between the lower can 121 and the upper can 122, an inner portion 123b disposed on the inner wall of the lower can 121, and a connection part 123c connecting an upper end of the outer portion 123a to an upper end of the inner portion 123b.

Particularly, the gasket 123 has a sealing protrusion 123d having a closed curve shape and formed on each of both surfaces thereof, and the sealing protrusion 123d is provided with an inner sealing protrusion 123d-1 having a closed curve shape and formed on an inner circumferential surface of an outer portion 123a of the gasket 123 and an outer sealing protrusion 123d-2 having a closed curve shape and formed on an outer circumferential surface of the outer portion 123a.

In addition, the lower insertion groove 121a formed in the lower can 121 and the upper insertion groove 122a formed in the upper can 122 are spaced apart from each other so as not to face each other. That is, referring to FIG. 5, the lower insertion groove 121a is disposed at a lower side, and the upper insertion groove 122a is formed to be disposed above the lower insertion groove 121a so that the lower insertion groove 121a and the upper insertion groove 122a are spaced apart so as not to face each other. In addition, the sealing protrusion 123d is formed on the surface of the gasket 123 in which the upper and lower insertion grooves 121a and 122a are not provided (i.e., the upper and lower insertion grooves are not in close contact therewith).

Particularly, each of the lower insertion groove 121a and the upper insertion groove 122a is formed in a triangular shape. Thus, when the lower can 121 and the upper can 122 are clamped, a portion of the gasket 123 disposed between the lower can 121 and the upper can 122 may be inserted up to the bottom of each of the lower insertion groove 121a and the upper insertion groove 122a. That is, an amount of insertion of the gasket inserted into the lower insertion groove 121a and the upper insertion groove 122a may be sufficiently secured.

In addition, inner surfaces of the lower insertion groove 121a and the upper insertion groove 122a each of which has a triangular shape and which face the upper can 122 are formed as a horizontal plane perpendicular to a direction in which the upper can 122 is clamped, and an inner surface facing the lower can 121 is formed as an inclined surface. That is, when the lower can 121 and the upper can 122 are clamped, a portion of the gasket 123 may be guided along the inclined surface and then smoothly introduced up to the bottom of each of the lower insertion groove 121a and the upper insertion groove 122a. In addition, when clamping of the lower can 121 and the upper can 122 is completed, the bonding between the lower can 121 and the upper can 122 may be improved through a portion of the gasket, which is supported on the horizontal plane.

Accommodation Process

Figure 6:
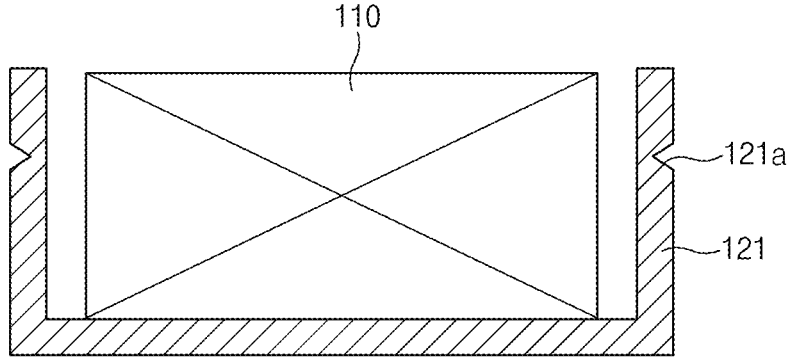
FIG. 6 is a cross-sectional view illustrating an accommodation process in the method for manufacturing the button-type secondary battery according to the first embodiment of the present invention.

In the accommodation process (S20), referring to FIG. 6, the electrode assembly 110 in which the first electrode, the separator, and the second electrode are alternately disposed is accommodated in an accommodation groove of the lower can 121.

Disposition Process

Figure 7:
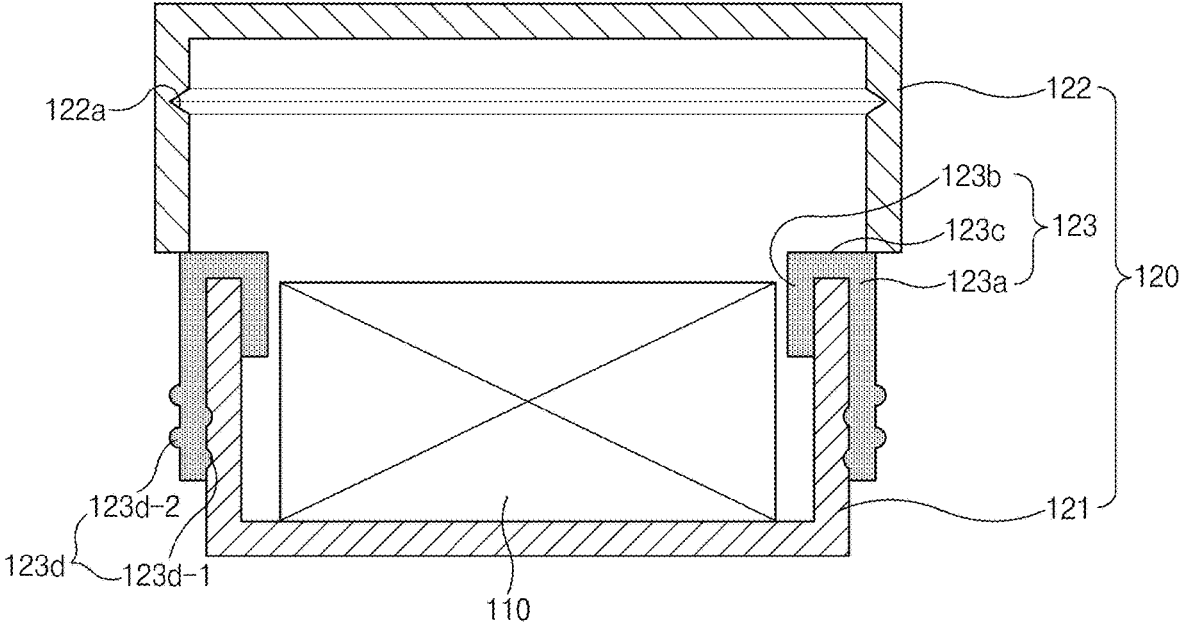
FIG. 7 is a cross-sectional view illustrating a disposition process in the method for manufacturing the button-type secondary battery according to the first embodiment of the present invention.

In the disposition process (S30), referring to FIG. 7, the gasket 123 is disposed on the lower can 121. Then, the outer portion 123a of the gasket 123 is supported on the outer circumferential surface of the lower can 121, the inner portion 123b is supported on the inner circumferential surface of the lower can 121, and the connection part 123c is supported on an upper end of the lower can 121.

Clamping Process

Figure 8:
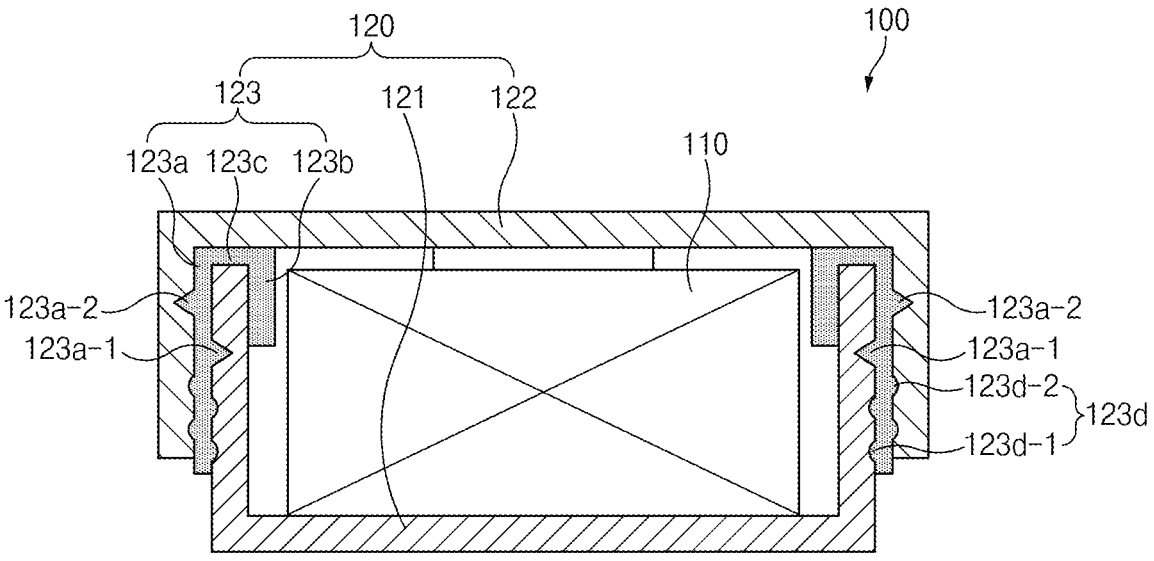
FIG. 8 is a cross-sectional view illustrating a clamping process in the method for manufacturing the button-type secondary battery according to the first embodiment of the present invention.

Referring to FIG. 8, in the clamping process (S40), the upper can 122 is disposed on the lower can 121, and then, the lower can 121 and the upper can 122 are clamped. That is, the button-type secondary battery 100 is manufactured by rolling the lower can 121 and the upper can 122 to be bonded to each other.

Here, when the lower can 121 and the upper can 122 are clamped, portions of the gasket 123 may be inserted into the lower insertion groove 121a and the upper insertion groove 122a to form a lower insertion protrusion 123a-1 and an upper insertion protrusion 123a-2 on a surface of the gasket 123, respectively. Here, each of the insertion protrusions has the same triangular shape as each of the lower insertion groove 121a and the upper insertion groove 122a. Thus, the bonding force and adhesion between the lower can 121 and the upper can 122 may increase.

That is, a contact area between the lower can 121 and the gasket 123 may increase by the lower insertion protrusion 123a-1 to increase in adhesion and bonding force. In addition, a contact area between the upper can 122 and the gasket 123 may increase by the upper insertion protrusion 123*a*-2 to increase in adhesion and coupling force.

Particularly, the inner sealing protrusion 123*d*-1 may be pressed to the lower can 121, and the outer sealing protrusion 123*d*-2 may be pressed to the upper can 122, and thus, the lower can 121 and the upper can 122 may significantly increase in bonding force and sealing force.

Therefore, the method for manufacturing the button-type secondary battery according to the first embodiment of the present invention may manufacture the button-type secondary battery 100, in which the bonding force and sealing force increase.

Hereinafter, in descriptions of another embodiment of the present invention, constituents having the same function as the above-mentioned embodiment have been given the same reference numeral in the drawings, and thus duplicated description will be omitted.

[Button-Type Secondary Battery According to Second Embodiment of the Present Invention]

Figure 9:
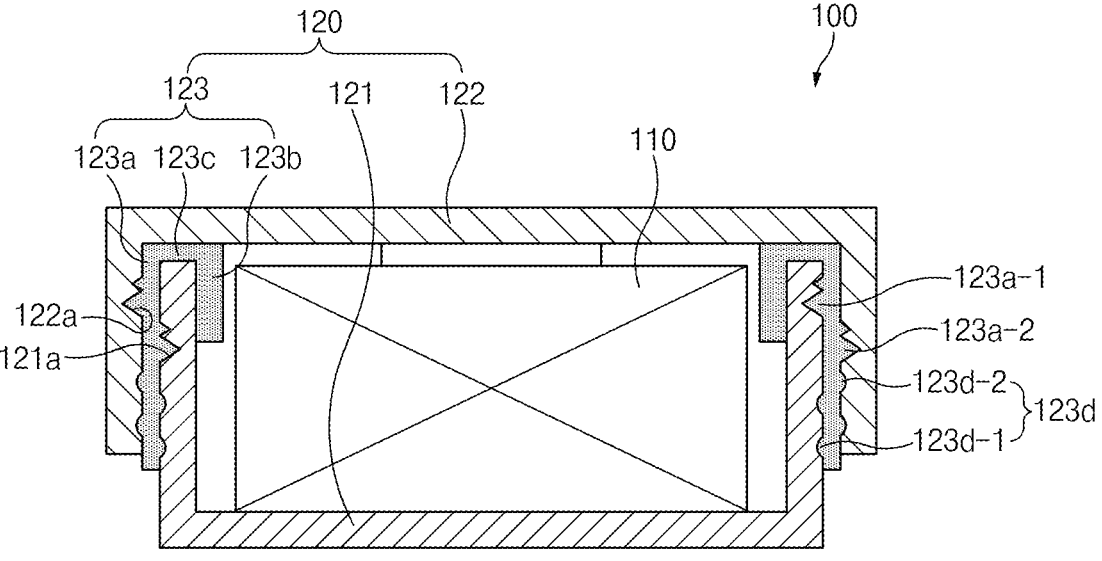
FIG. 9 is a cross-sectional view of a button-type secondary battery according to a second embodiment of the present invention.

As illustrated in FIG. 9, a button-type secondary battery 100 according to a second embodiment of the present invention has a lower can 121 having a lower insertion groove 121*a* formed in an outer circumferential surface thereof, and an upper can 122 having an upper insertion groove 122*a* in an inner circumferential surface thereof.

Here, the lower insertion groove 121*a* or the upper insertion groove 122*a* is provided in two or more, and the two or more lower insertion grooves 121*a* or the two or more upper insertion grooves 122*a* has a structure in which the lower can 121 and the upper can 122 are connected to each other in a direction in which the lower can 121 and the upper can 122 are clamped. That is, the two or more lower insertion grooves 121*a* or the two or more upper insertion grooves 122*a* are provided to be connected to each other in a vertical direction as illustrated in FIG. 9.

Thus, in the button-type secondary battery 100 according to the second embodiment of the present invention, when the lower can 121 and the upper can 122 are clamped, a portion of the gasket 123 may be introduced into the two or more lower insertion grooves 121*a* or the two or more upper insertion grooves 122*a* to form two or more insertion protrusions 123*a*-1 and 123*a*-2. Thus, bonding force and adhesion between the lower can 121 and the upper can 122 may significantly increase.

Particularly, as illustrated in FIG. 8, the two or more lower insertion grooves 121*a* or two or more of the upper insertion grooves 122*a* gradually increase in size in a direction, in which the lower can 122 and the upper can 121 are clamped. Of course, the two or more lower insertion grooves 121*a* and the two or more upper insertion grooves 122*a* are formed to be spaced apart from each other so as not to face each other. Thus, a portion of the gasket 123 may be induced to be smoothly introduced into the two or more lower insertion grooves 121*a* or the two or more upper insertion grooves 122*a*.

In the method for manufacturing the button-type Secondary battery, which has such a structure, according to the second embodiment of the present invention, in the preparation process, the lower insertion groove 121*a* or the upper insertion groove 122*a* is provided in two or more in the lower can 121 and the upper can 122. Particularly, the two or more lower insertion grooves 121*a* or two or more of the upper insertion grooves 122*a* are connected to each other in a direction, in which the lower can 121 and the upper can 122 are clamped, and are formed to gradually increase in size.

In addition, when the lower can 121 and the upper can 122 are clamped in the clamping process, portions of the gasket 123 are introduced into the two or more lower insertion grooves 121*a* or the two or more upper insertion grooves 122*a* to form two or more insertion protrusions 123*a*-1 and 123*a*-2. Thus, the bonding force and the adhesion force between the lower can 121 and the upper can 122 may increase through the two or more insertion protrusions 123*a*-1 and 123*a*-2.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A button secondary battery comprising:
   a lower can configured to serve as a first electrode terminal;
   an upper can surrounding the lower can and configured to serve as a second electrode terminal; and
   a gasket between the lower can and the upper can,
   wherein a recessed lower insertion groove and a recessed upper insertion groove are in a vertical surface of the lower can and a vertical surface of the upper can, respectively, which are in direct contact with the gasket, respectively,
   wherein the lower insertion groove and the upper insertion groove are vertically spaced apart from each other so as not to face each other,
   wherein a sealing protrusion having a closed curve shape and being in direct contact with the lower can and the upper can to increase in sealing force is on the gasket, and
   wherein the sealing protrusion is vertically spaced apart from both the lower insertion groove and the upper insertion groove so that the sealing protrusion is absent in the lower insertion groove and the upper insertion groove.

2. The button secondary battery of claim 1, wherein the lower insertion groove and the upper insertion groove are at a side of the surface of the lower can and a side of the surface of the upper can, respectively, and
   wherein the sealing protrusion is formed on a surface of the gasket that is in direct contact with the other side of the surface of the lower can and the other side of the surface of the upper can.

3. The button secondary battery of claim 1, wherein the sealing protrusion comprises:
   an inner sealing protrusion on an inner circumferential surface of the gasket and having a closed curve shape that is pressed to the surface of the lower can; and
   an outer sealing protrusion on an outer circumferential surface of the gasket and having a closed curve shape that is pressed to the surface of the upper can.

4. The button secondary battery of claim 3, wherein the inner sealing protrusion and the outer sealing protrusion are disposed to be spaced apart from each other so as not to be symmetrical to each other with respect to the gasket.

5. The button secondary battery of claim 1, wherein portions of the gasket are introduced into the lower insertion groove and the upper insertion groove by clamping of the lower can and the upper can to define a lower insertion protrusion and an upper insertion protrusion on a surface of the gasket, respectively,
   wherein a contact area between the lower can and the gasket increases by the lower insertion protrusion, and wherein a contact area between the upper can and the gasket increases by the upper insertion protrusion.

6. The button secondary battery of claim 1, wherein the lower insertion groove or the upper insertion groove has a triangular shape that gradually decreases in width toward a bottom.

7. The button secondary battery of claim 1, wherein the lower insertion groove or the upper insertion groove includes two or more lower insertion grooves or two or more upper insertion grooves, and wherein the two or more lower insertion grooves or the two or more upper insertion grooves are provided so that ends of the lower insertion grooves or the upper insertion grooves are connected to each other in a direction in which the lower can and the upper can are clamped to each other.

8. The button secondary battery of claim 7, wherein the two or more lower insertion grooves or the two or more upper insertion grooves gradually increase in size in a direction in which the lower can and the upper can are clamped to each other.

\* \* \* \* \*